United States Patent
Petty et al.

(10) Patent No.: US 8,180,935 B2
(45) Date of Patent: May 15, 2012

(54) METHODS AND APPARATUS FOR INTERCONNECTING SAS DEVICES USING EITHER ELECTRICAL OR OPTICAL TRANSCEIVERS

(75) Inventors: William K. Petty, Colorado Springs, CO (US); Brian A. Day, Colorado Springs, CO (US); Timothy E. Hoglund, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 293 days.

(21) Appl. No.: 12/470,704

(22) Filed: May 22, 2009

(65) Prior Publication Data

US 2010/0296815 A1 Nov. 25, 2010

(51) Int. Cl.
*G06F 13/00* (2006.01)

(52) U.S. Cl. ......... 710/31; 710/5; 710/7; 710/8; 710/15; 710/17; 710/18; 710/19; 710/20; 710/32

(58) Field of Classification Search ............... 710/5, 7, 710/8, 15, 17, 18, 19, 20, 31, 32
See application file for complete search history.

(56) References Cited

U.S. PATENT DOCUMENTS

| | | | |
|---|---|---|---|
| 7,027,394 B2 | 4/2006 | Gupta et al. | |
| 7,155,546 B2 | 12/2006 | Seto | |
| 7,373,442 B2 | 5/2008 | Seto | |
| 7,373,443 B2 | 5/2008 | Seto | |
| 7,949,489 B2 * | 5/2011 | Cagno et al. | 702/158 |
| 2005/0190690 A1 * | 9/2005 | Tran | 370/216 |
| 2008/0183917 A1 | 7/2008 | Cagno et al. | |
| 2008/0192814 A1 * | 8/2008 | Hafed et al. | 375/224 |
| 2008/0205501 A1 * | 8/2008 | Cioffi et al. | 375/224 |

* cited by examiner

*Primary Examiner* — Tariq Hafiz
*Assistant Examiner* — Jasjit Vidwan
(74) *Attorney, Agent, or Firm* — Duft Bornsen & Fishman LLP

(57) ABSTRACT

Methods and systems for encoding and/or decoding digital signals representing serial attached SCSI (SAS) out of band (OOB) signals exchanged over an optical communication between two SAS devices. A SAS OOB signal to be transmitted from a first SAS device to a second SAS device is first encoded as a digitally encoded signal representing the analog SAS OOB signal and then transmitted over an optical communication medium to another SAS device. A receiving SAS device coupled to an optical communication medium decodes a received digitally encoded signal to detect a received, encoded SAS OOB signal and processes the received SAS OOB signal when receipt is detected. The digitally encoded signal may comprise an idle word portion and a burst word portion to represent various SAS OOB signals. Further, the digitally encoded signal may be precomputed in a variety of disparity forms and stored in a memory for lookup and retrieval.

21 Claims, 5 Drawing Sheets

METHODS AND APPARATUS FOR INTERCONNECTING SAS DEVICES USING EITHER ELECTRICAL OR OPTICAL TRANSCEIVERS

BACKGROUND

1. Field of the Invention

The invention relates generally to serial attached SCSI (SAS) device interconnections and more specifically relates to methods and apparatus for using either electrical or optical transceivers for such SAS device interconnections.

2. Discussion of Related Art

SAS standards include a detailed specification of the electrical interconnect utilized between two SAS devices. Electrical signaling standards are defined for a variety of transmission rates between devices including, at present, up to 6 GB per second data signaling. Further enhancements to SAS specifications envision 12 GB or higher speed in the relatively near future.

In the SAS signaling standards, out of band (OOB) signals are low-speed signal patterns that do not appear in normal data streams. OOB signals consist of a defined amount of idle time followed by a defined amount of burst time, the idle-burst pair repeated a specified number of times, and ending with a period of idle time. In accordance with the SAS (and serial advanced technology attachment-SATA) standards, in the idle period of the SAS OOB signal the electrical interconnection physical link carries a D.C. idle level—i.e., a differential 0V signal where the positive and negative differential signal paths are both driven toward ground potential. During the burst time of the SAS OOB signal the differential electrical physical link carries signal transitions represented as differential voltages driven on the positive and negative signal paths between the transceiver transmission transceiver and the receiving transceiver—thus presenting a level of energy to be received by the other side.

A variety of OOB signals are differentiated based on the duration of the idle time between the various burst times and other timing aspects of the idle and burst signaling periods. SAS and SATA specifications include a variety of such OOB signals including, for example, COMSAS, COMINIT, COMRESET, and, COMWAKE.

Despite the use of differential electrical signaling in accordance with the SAS specifications, as the transmission rates increase, cable length for the electrical signaling is limited. For example, at relatively high SAS transmission speeds electrical signaling cables may be limited to no more than a few meters of total length to avoid degradation of the signal quality.

Fiber-optic signaling capabilities are known to provide both high speed transmission and noise immunity over significant lengths of optical transmission media. However, in view of the requirements in the SAS standard for OOB signaling, it has been problematic to effectively utilize fiber-optic signaling for interconnection of SAS devices. In particular, current SFP (small form-factor pluggable) optical transceivers (including widely utilized quad small form-factor pluggable-QSFP) are incapable of utilizing present SAS standards for electrical OOB signaling. In particular, there is no optical midpoint or "D.C. idle" signal available in such SFP optical transceiver modules. In other words there is no equivalent signaling capability in SFP optical transceivers to represent an OOB idle time.

Some prior solutions have attempted to provide OOB signaling for SAS interconnect utilizing optical transceiver modules by encoding an idle time as the period of time that an optical laser is turned off (i.e., an optical laser off duration represents some analogous idle time duration in accordance with the SAS specifications). This prior technique presents other problems—the turn-on/turn-off time of high speed, low cost, SFP optical modules is several orders of magnitude slower than the timing requirements for OOB signaling in accordance with the SAS and SATA specifications. Further, problems arise in the receiving transceiver sensing loss of optical signal. The receiving transceiver sensing of a loss of optical signaling (RXloss) may impose further significant delays and distortion in the timing such that the desired OOB transmission may be corrupted.

Thus it is an ongoing challenge to provide simple, cost-effective, high-speed optical signaling between SAS/SATA devices that permit full compliance with the SAS/SATA standard including the OOB signaling capabilities.

SUMMARY

The present invention solves the above and other problems, thereby advancing the state of the useful arts, by providing methods, apparatus, and systems for utilizing digital encoding of SAS OOB signals to enable use of optical communication media for coupling SAS/SATA devices. Features and aspects hereof permit devices to optionally use either standard SAS/SATA electrical signaling over electrical communication media or digitally encoded SAS OOB signaling to permit use of either electrical or optical communication media.

Features and aspects hereof include apparatus associated with a serial attached SCSI (SAS) device for coupling with another SAS device using an optical physical communication medium or using an electrical physical communication medium. The apparatus includes PHY control circuits coupled with a physical communication interface and adapted to control data exchanges on the physical communication medium. The apparatus also includes digital out of band (OOB) decoder logic coupled with the PHY control circuits. The digital OOB decoder logic is adapted to detect receipt of a digitally encoded signal corresponding to a SAS OOB signal. The digitally encoded signal is received from said another SAS device through the PHY control logic. The apparatus also includes digital OOB encoder logic coupled with the PHY control circuits. The digital OOB encoder logic is adapted to generate a digitally encoded signal corresponding to a SAS OOB signal. The digital OOB encoder is further adapted to apply the digitally encoded signal to the PHY control circuits for transmission to the other SAS device.

Other features and aspects hereof include a method operable in a serial attached SCSI (SAS) device. The method includes receiving over a communication medium a digitally encoded signal from another SAS device and decoding the received digitally encoded signal to generate a signal representing a SAS out of band (OOB) signal. The method then processes the generated signal as though the SAS OOB signal had been received.

Still other features and aspects hereof include a method operable in a serial attached SCSI (SAS) device. The method includes generating a SAS OOB signal within the SAS device to be forwarded to another SAS device and encoding the SAS OOB signal as a digitally encoded signal. The method then transmits the digitally encoded signal over a communication medium to said another SAS device.

DETAILED DESCRIPTION OF THE DRAWINGS

Figure 1:
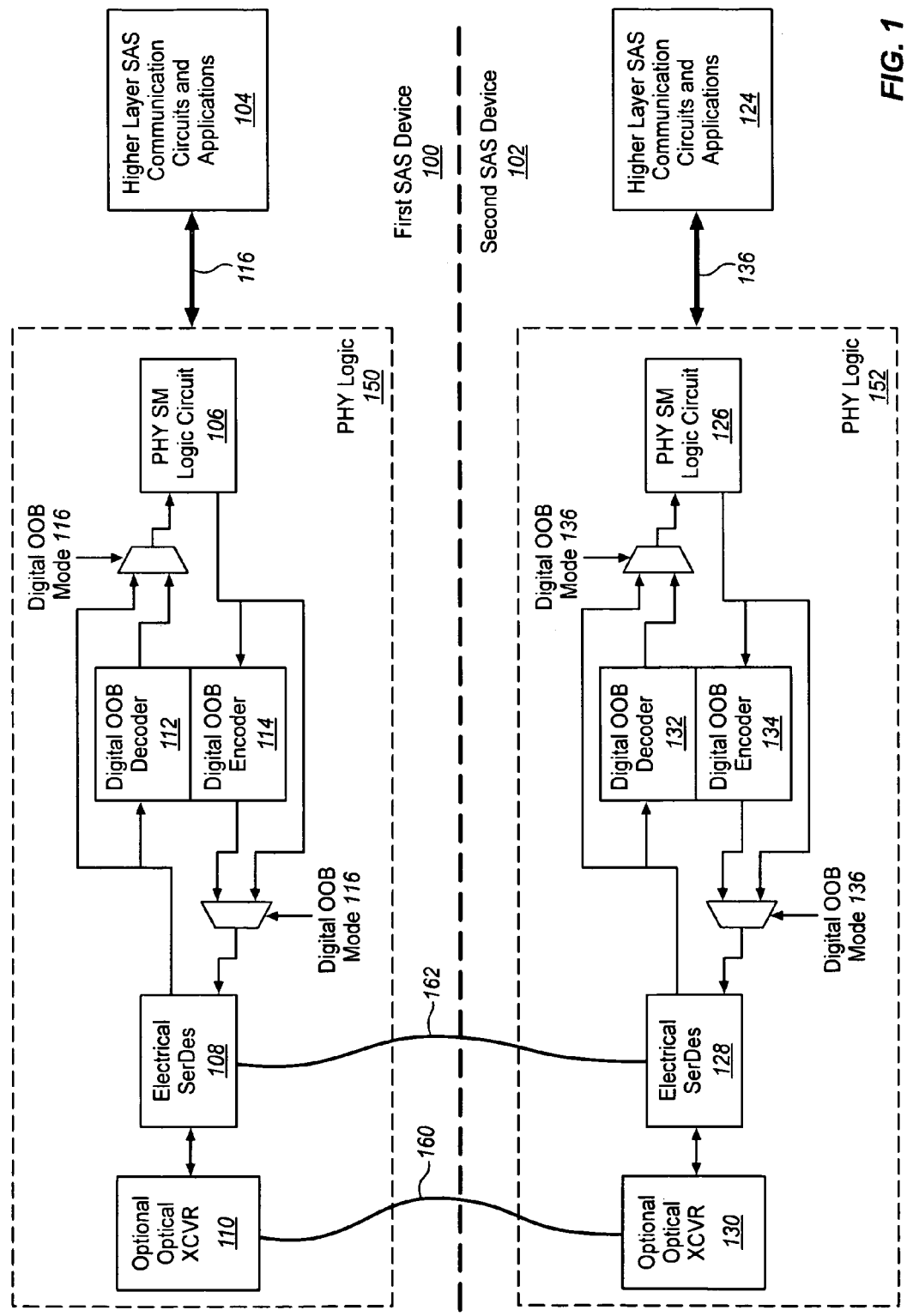
FIG. 1 is a block diagram of an exemplary SAS device enhanced in accordance with features and aspects hereof to provide optional digital encoding of SAS OOB signals for exchange over optical or electrical communication media.

FIG. 1 is a block diagram of a SAS domain including a first SAS device 100 coupled with a second SAS device 102. Each of SAS first device 100 and second SAS device 102 is enhanced in accordance with features and aspects hereof to enable digital encoding and decoding of SAS OOB signals transferred between the two SAS devices. By digitally encoding SAS OOB signals, SAS communications utilizing an optical communication medium 160 is possible. As noted above, without the enhanced features and aspects hereof within first SAS device 100 and second SAS device 102, optical communication media has presented significant challenges for SAS domains.

First SAS device 100 includes PHY logic 150 enhanced in accordance with features and aspects hereof to include logic for digitally encoding SAS OOB information and decoding received digital information representing an encoded SAS OOB signal. PHY logic 150 is coupled via path 116 with higher layer SAS communications circuits and applications 104 directing PHY logic 150 to exchange information with the second SAS device 102. In like manner, second SAS device 102 includes enhanced PHY logic 152 coupled via path 136 to higher layer SAS communications circuits and applications 124.

Enhanced PHY logic 150 includes PHY state machine (SM) control circuit 106 essentially providing standard features of the PHY control as defined by the SAS specifications. Such PHY SM control logic 106 is generally defined in the SAS specifications as a state machine operable to encode and decode SAS information exchanged over the communication medium such as optical communication medium 160 or electrical communication medium 162. As is generally known in present SAS devices, PHY logic 150 may include an electrical serializer/deserializer (SerDes) 108 for transmitting and receiving modulated electrical signals (i.e., differential voltage electrical signals) over electrical communication medium 162 for exchange of information between first SAS device 100 and second SAS device 102.

In accordance with features and aspects hereof, enhanced PHY logic 150 may also include optical transceiver (XCVR) circuit 110 adapted to modulate SAS data as optical signals over optical communication path 160. The enhanced PHY logic 150 may include digital OOB decoder logic 112 and digital OOB encoder 114 arranged in conjunction with digital OOB mode multiplexors 116 to selectively switch so as to couple between PHY SM logic circuit and SerDes 108. In a first configuration of multiplexers 116, PHY SM logic circuit 106 is directly coupled with SerDes 108 in a manner to provide electrical signaling between device 100 and device 102. This standard electrical signaling includes standard SAS OOB signaling relying on D.C. Idle signals.

In a second configuration of multiplexers 116, digital OOB decoder 112 and digital OOB encoder 114 are interposed between PHY SM logic circuit 106 and SerDes 108 and are operable to sense (decode) and generate (encode), respectively, a digitally encoded signal representing a SAS OOB signal exchanged between devices 100 and 102. Such a digitally encoded signal may be applied to optical communication path 160 through optical transceiver 110 for exchange between the first SAS device 100 and the second SAS device 102. In addition, the digitally encoded SAS OOB signals may be exchanged over electrical communication medium 162 through SerDes 108. Digital OOB decoder 112 is operable to receive a digitally encoded signal through SerDes 108 from communication path 160 and decode the received digitally encoded signal to generate a corresponding SAS OOB signal for application to PHY SM logic circuit 106. Digital OOB encoder 114 is operable to generate a digitally encoded SAS OOB signal in response to signals from PHY SM logic circuit 106 and to apply the generated digitally encoded SAS OOB signals to SerDes 108 for application to a communication medium and forwarding to the second SAS device 102.

Those of ordinary skill in the art will readily recognize that the OOB decoder 112 and encoder 114 may be integrated as distinct circuits physically interposed (with appropriate multiplexer switching logic) between PHY SM logic circuit 106 and SerDes 108 as illustrated in FIG. 1. Alternatively, the decoder and encoder (112 and 114) may be integrated within the PHY SM logic circuit 106 or within the electrical SerDes 108. Still further, the features of decoder 112 and encoder 114 may be integrated within active components physically integrated in the connector of a cable that couples with PHY logic 150 rather than integrated within the PHY logic 150 per se of first SAS device 100. In like manner, the optical transceivers (110 and 130) and SerDes (108 and 128) may be integral within the PHY logic (150 and 152) or may be a separate components.

As noted herein, it will be recognized that the digital encoding and decoding of SAS OOB signals may be utilized regardless of the particular type of communication medium employed whereas standard SAS OOB analog signaling cannot be used on optical communication media. Though such digital encoding of SAS OOB signals is not required on electrical communication medium 162, features and aspects hereof for such digital encoding of SAS OOB may be utilized on such a communication medium as well as on the optical communication medium 160.

PHY logic 152 in second SAS device 102 is essentially identical to PHY logic 150 in first SAS device 100. In particular, PHY SM logic circuit 126 communicates with higher layer SAS communication circuits and applications 124 via path 136. Circuit 126 then communicates with electrical SerDes 128 directly in one configuration of multiplexers 136. Digital OOB decoder 132 and digital OOB encoder 134 may be interposed between circuits 126 and 128 in a second configuration of multiplexers 136. An optional optical transceiver 130 may also be provided to allow optical communication of SAS exchanges including digitally encoded SAS OOB signals.

Those of ordinary skill in the art will readily recognize that each SAS device (100 and 102) may represent any of a number of types of SAS devices including, for example, a SAS initiator, a SAS target, or a SAS expander. Further, those of ordinary skill in the art will readily recognize that the enhanced features and aspects hereof may be implemented as integral within PHY logic circuits 150 and 152, may be external to the PHY logic (i.e., within an active cable connector), or any other suitable integration within the enhanced SAS device. These and other design choices will be readily apparent to those of ordinary skill in the art for implementation of the enhanced features and aspects hereof.

Figure 2:
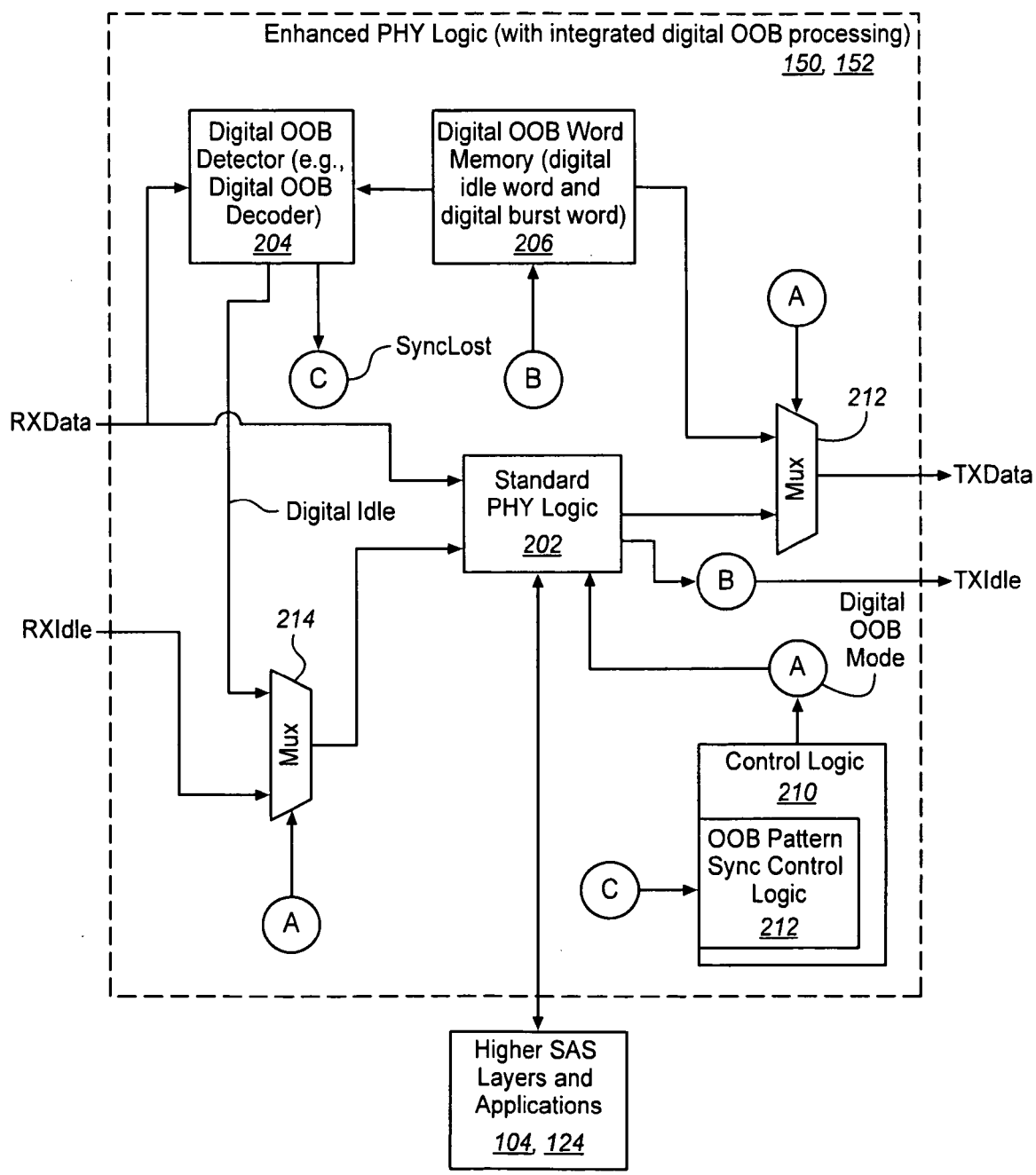
FIG. 2 is a block diagram of an exemplary SAS PHY logic circuit enhanced in accordance with features and aspects hereof to provide optional digital encoding of SAS OOB signals for exchange over optical or electrical communication media.

FIG. 2 is a block diagram providing exemplary additional details of enhanced PHY logic 150 and 152 of FIG. 1. Specifically, FIG. 2 shows the digital OOB decoding and encoding logic in an exemplary embodiment as combined with the standard PHY logic (i.e., the PHY SM logic circuits as discussed in FIG. 1). Enhanced PHY logic 150 and 152 may include standardized PHY logic 202 operable generally in accordance with the state machine model specified in the SAS standards. Implementation details of such a standard PHY logic component are well known to those of ordinary skill in the art and documented in the SAS standards and thus need not be further presented herein.

Control logic 210 of the enhanced PHY logic generates a Digital OOB Mode signal (label "A") when the digital mode of SAS OOB processing is selected (e.g., for use with optical communication medium). This digital mode of operation may be selected by an administrative user/process (not shown) interacting with the control logic 210 to configure the digital mode of OOB processing or the standard electrical mode specified by the SAS standards.

In general, standard PHY logic 202 receives an RXData signal from a SerDes circuit (not shown in FIG. 2) coupled to the communication medium (optionally through an optical transceiver as noted above). The RXData signal is also applied to a digital OOB detector 204 for detecting/decoding a digitally encoded SAS OOB signal that may be received on the RXData signal path from another SAS device enhanced in accordance with features and aspects hereof. An RXIdle signal from the SerDes indicates detection of a D.C. idle condition when the SerDes circuit is coupled to an electrical communication medium utilizing the SAS standard idle signaling for SAS OOB conditions. In a standard SAS electrical connection, such an RXIdle signal is asserted for the duration of the D.C. idle condition sensed on the electrical communication medium by the SerDes. In such a standard electrical connection, an idle period is followed by a burst condition on the electrical communication medium. These pairs of idle and burst periods on the electrical communication medium are repeated as per the SAS standards. The number and duration of the various idle and burst conditions represents different SAS OOB signals as specified by the SAS standards.

Where digital encoding of OOB signals is enabled in accordance with features and aspects hereof, a Digital Idle signal is asserted by the digital OOB detector 204 when a digitally encoded idle word is sensed by digital OOB detector 204 from the data received on RXData from the SerDes. The Digital Idle signal is cleared when a digitally encoded burst word is detected as received on the RXData signal from the other SAS device. Multiple digitally encoded idle and burst words may be transmitted from the other SAS device to provide the desired number and duration of the idle and burst conditions to represent the various SAS OOB signals. Other SAS encoded words may be received in between the one or more idle words and the one or more burst words.

The RXIdle signal from the SerDes (representing sensing of a D.C. idle) and the Digital Idle signal from the digital OOB detector 204 are applied as inputs to multiplexer 214. The output of multiplexer 214 is controlled by the Digital OOB Mode signal (label "A") generated by the control logic 210. The Digital Idle signal is selected as output of multiplexer 214 when the Digital OOB Mode signal is asserted and the RXIdle signal is selected for output from multiplexer 214 otherwise. The selected signal indicating detection of an idle condition is applied to the standard PHY logic 202 invoking standard processing within the PHY state machine of logic 202 in response to detection of the idle condition (and corresponding burst conditions following each idle condition as specified by SAS standards).

In the context of the digital OOB operation as controlled by control logic 210, digital OOB detector 204 detects receipt of a digitally encoded signal representing a SAS OOB idle condition in the communication medium. Such a digitally encoded signal may be applied to either an optical or electrical communication medium from another SAS device similarly enhanced in accordance with features and aspects hereof to utilize digitally encoded OOB signals to represent SAS OOB conditions. Digital OOB detector 204 utilizes the digital OOB word memory 206 to retrieve an appropriately encoded (for disparity) idle word that represents the digitally encoded signal representing the idle word in the digital OOB encoding structures.

The digitally encoded words stored in memory 206 may be stored in both possible forms of disparity as is provided by the 8b10b encoding used in SAS protocols. Thus the appropriate disparity version may be selected to detect receipt in digital OOB detector 204 to detect receipt of a digitally encoded idle word or a digitally encoded burst word.

Standard PHY logic 202 communicates all received SAS data to a higher level of SAS layers and applications 104 or 124 as discussed above. In addition, information to be transmitted to another SAS device is received by standard PHY logic 202 from the higher SAS layers and applications 104 or 124. Under control of control logic 210, standard PHY logic 202 generates transmit data output signals (TXData) applied as an input to multiplexer 212. Standard PHY logic 202 also generates a TXIdle signal (label "B") indicating the need to transmit a D.C. Idle condition. Both TXData and TXIdle are normally applied directly to the SerDes for modulation using electrical signals to transmit SAS data and SAS OOB signals. The TXIdle signal is also applied to digital OOB memory 206 to select either a digitally encoded idle word (when TXIdle is asserted) or a digitally encoded burst word (when TXIdle is not asserted) for application as a second input to multiplexer 212.

Multiplexer 212 under control of control logic 210 generating the Digital OOB Mode signal (label "A") then selects either the transmit data output of standard PHY logic 202 (TXData) or a selected digital OOB word from memory 206 for application to the TXData output of enhanced PHY logic 150 or 152. The TXData signal so generated is then applied to a SerDes circuit (not shown) for modulation on the desired communication medium. Other standard transmitted SAS data (e.g., non-OOB SAS data) is generated by standard PHY logic 202 and applied to the TXData output through an appropriate selection of multiplexer 212 by control logic 210. The digitally encoded signals representing a SAS OOB condition and the standard generated SAS data from standard PHY logic 202 may thus be applied to the TXData signal and modulated by an appropriate SerDes circuit onto the desired communication medium—either optical or electrical.

As noted above, the digitally encoded words (idle and burst words) stored in memory 206 may be stored in both forms of disparity as defined by SAS 8b10b encoding standards for appropriate selection and application to the TXData signal path. The digitally encoded words stored in the memory 206 may be programmed by an administrative user through the control logic 210 or may be statically defined at time of manufacture of the SAS device embodying the enhanced PHY logic 150 or 152.

Those of ordinary skill in the art will readily recognize numerous additional and equivalent features and modules within fully functional enhanced PHY logic circuits 150 or 152 as depicted in FIGS. 1 and 2 described above. Such additional and equivalent elements are omitted herein for simplicity and brevity of this discussion but will be readily apparent to those of ordinary skill in the art. The specific signals utilized for any particular embodiment will depend on the signals available in an existing design of standard PHY logic 202 and the accompanying SerDes. Those of ordinary skill in the art will readily recognize which signals may be used from an existing PHY layer and SerDes to allow integration with the enhanced digital OOB features and aspects hereof. Further, those of ordinary skill in the art will readily recognize that the enhanced digital OOB features and aspects hereof may be integrated within the PHY logic as shown in FIGS. 1 and 2 and/or may be integrated within other levels and layers of circuitry associated with an enhanced first and second SAS device. Such design choices will be readily apparent to those of ordinary skill in the art. Still further, those of ordinary skill in the art will readily recognize numerous, well known, commercially available circuits for the desired SerDes capability including, for example, the GigaBlaze® circuit from LSI Corporation.

Figure 3:
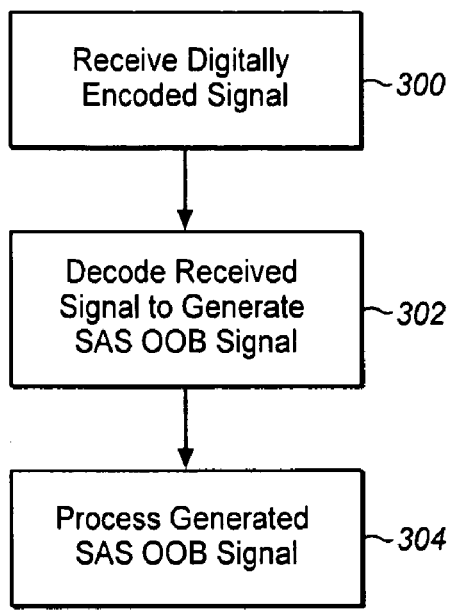
FIGS. 3 through 6 are flowcharts describing exemplary methods in accordance with features and aspects hereof to provide optional digital encoding of SAS OOB signals for exchange over optical or electrical communication media.
Figure 4:
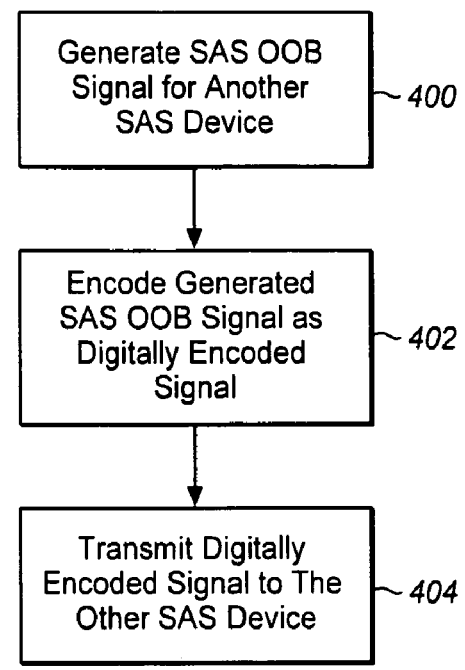

FIGS. 3 and 4 are flowcharts representing exemplary methods in accordance with features and aspects hereof to use digitally encoded signals for SAS OOB communications. The exemplary methods of FIGS. 3 and 4 may be generally operable in an enhanced SAS device such as depicted in FIGS. 1 and 2 described above. As noted above, the enhanced features of the methods of FIGS. 3 and 4 may be implemented within an enhanced PHY logic circuit of an enhanced SAS device or within other circuits or logic implemented within the enhanced SAS device. Still further, the methods of FIGS. 3 and 4 may be operable within enhanced circuitry and logic external to the SAS device suitably implemented as a plug-on card or daughter-board logic adapted to couple with an unenhanced SAS device. In such an external embodiment, those of ordinary skill in the art will readily recognize as a matter of design choice the need to expose signals used within the PHY layer and/or SerDes circuits for use within the external enhanced circuit features to supply digital encoding and decoding of SAS OOB signals.

The exemplary method of FIG. 3 represents processing within the enhanced SAS device for receiving digitally encoded signals on a SAS communication medium representing associated SAS OOB signals. As noted above, digitally encoded OOB information may be transmitted and received on an optical communication medium as well as an electrical communication medium. An electrical SAS communication medium may also be adapted for standard SAS OOB analog signaling.

Step 300 represents receipt of a digitally encoded signal on the SAS communication medium (e.g., from an optical SAS communication meeting). Where the received digitally encoded signal represents a SAS OOB transmission, step 302 decodes the received signal to generate the corresponding SAS OOB signal for further utilization within the enhanced SAS device. As noted above and in accordance with the SAS standards, decoding of a particular SAS OOB signal is performed by sensing the duration of idle and burst conditions received from another SAS device. Where digital OOB encoding/decoding features and aspects hereof are employed, the duration of an idle or burst condition is determined by the number of digitally encoded idle words and digitally encoded burst words (and hence the duration of each condition). Step 304 then processes the generated SAS OOB signal within the enhanced SAS device. As noted above, such SAS OOB signals that may be digitally encoded for use, in particular, on an optical transmission medium. The digitally encoded SAS OOB signals may include, for example, COMINIT, COMSAS, COMWAKE, etc.

The exemplary method of FIG. 4 represents processing within the enhanced SAS device for generating and transmitting a SAS OOB signal as an appropriately encoded digital signal for transmission on, for example, an optical communication medium (or optionally on an electrical communication medium also generally capable of standard SAS OOB communications).

Step 400 represents processing to generate a SAS OOB signal intended for transmission to another SAS device. Step 402 then encodes the generated SAS OOB signal as a digitally encoded signal for transmission over a SAS communication medium (e.g., an optical communication medium). Step 404 then transmits the digitally encoded signal to the other SAS device. As noted herein, the encoding of a particular SAS OOB signal is defined in SAS standards by the duration and number of alternating idle and burst conditions. Thus the digital encoding of such SAS OOB signals may generally entail transmitting digitally encoded idle and burst words to the other SAS device so as to indicate a corresponding idle and burst condition for the designated durations for encoding of a particular SAS OOB signal. The other SAS device, similarly enhanced, receives such a digitally encoded signal and decodes the intended SAS OOB signal for further processing as discussed above with respect to FIG. 3.

Those of ordinary skill in the art will readily recognize numerous additional and equivalent steps that may be present in fully functional methods for receiving digitally encoded SAS OOB signals and for generating and transmitting SAS OOB signals as digitally encoded signals. Such additional and equivalent steps are omitted herein for simplicity and brevity of this discussion but will be otherwise readily apparent to those of ordinary skill in the art.

Figure 5:
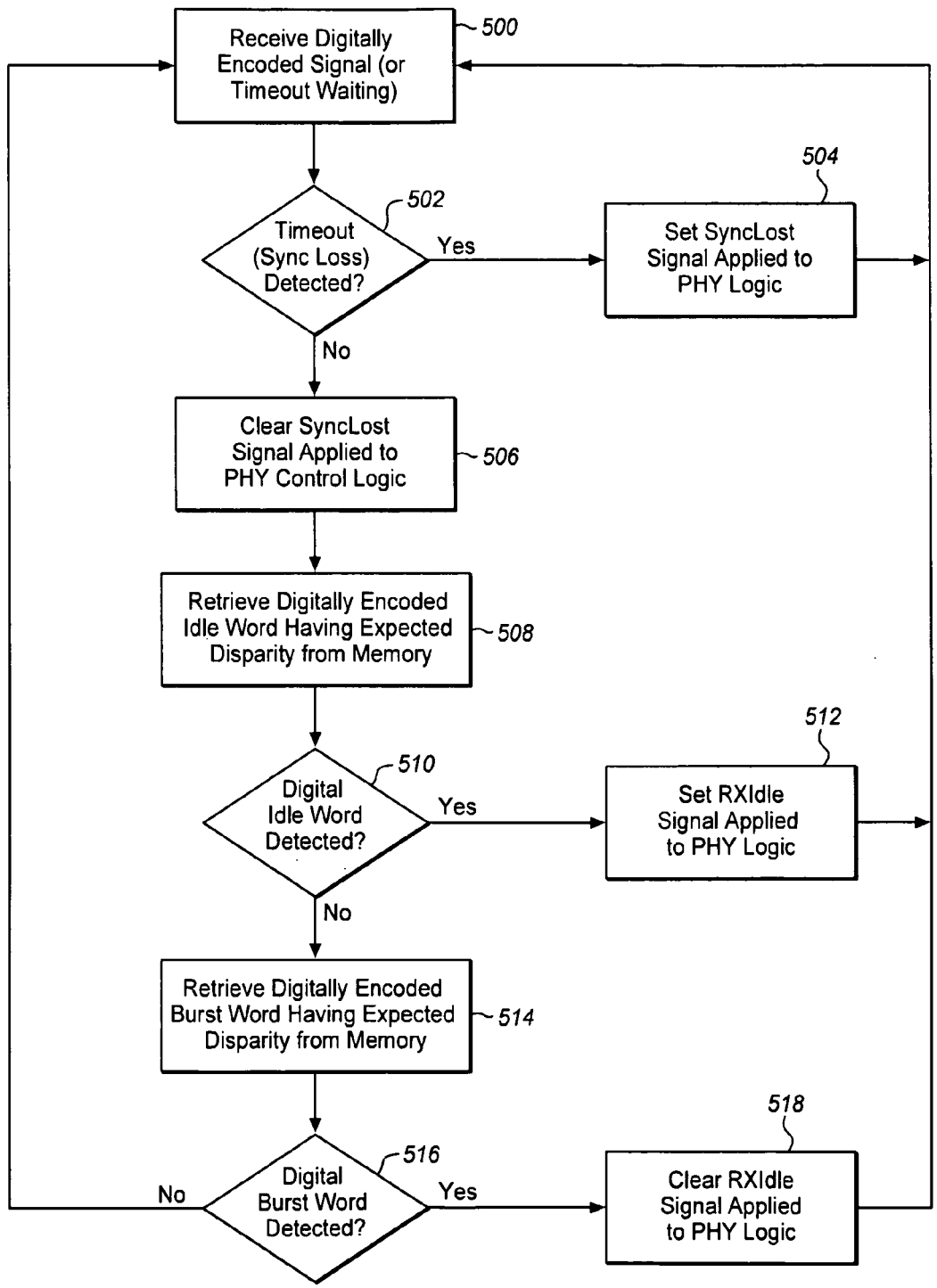

FIG. 5 is a flowchart describing another exemplary method in accordance with features and aspects hereof. The exemplary method of FIG. 5 describes a method for receiving digitally encoded signals representing SAS OOB conditions exchanged between enhanced SAS devices in accordance with features and aspects hereof. The method of FIG. 5 may be performed and integrated within enhanced SAS devices such as described above with respect to FIGS. 1 and 2.

Step 500 represents receipt of a digitally encoded signal on the SAS communication medium (either optical or electrical communication media) or (optionally) expiration of a timeout awaiting receipt of a digitally encoded SAS signal. The optional timeout feature helps to detect a possible loss of synchronization while awaiting a digitally encoded SAS OOB word. When awaiting receipt of a word (such as a digitally encoded SAS OOB signal) it is possible that word sync may be lost. When using the digital encoding of SAS OOB words in accordance with features and aspects hereof it may be useful to sense the loss of word synchronization and to force resynchronization in response to such a loss. By contrast, existing electrical SAS OOB signaling standards do not require maintaining word synchronization since the idle and burst conditions are not signaled as digitally encoded words. Step 502 next determines whether a SAS word was received or the optional timeout was encountered waiting for receipt of such a word. If the optional timeout period was encountered, a SyncLost signals may be applied to the PHY logic to force resynchronization of the SAS communication medium. Processing then continues looping back to step 500 to await receipt of a next digitally encoded SAS word. If step 502 determines that a digitally encoded word was received, the SyncLost signal is reset at step 506 (along with any optional timeout counters).

Upon receipt of a digitally encoded SAS word, step 508 retrieves the digitally encoded idle word from a memory associated with the enhanced SAS device for purposes of comparing the digitally encoded idle word with a received digitally encoded signal. As noted above, the memory storing the idle word may preferably store the idle word in either of two possible disparity states (i.e., even disparity and odd disparity). Step 508 retrieves the idle word having the expected disparity from the associated memory. Step 510 then compares the retrieved digitally encoded idle word to the received digitally encoded signal. If the received digitally encoded signal is a digitally encoded idle word processing continues at step 512 sets the RXIdle signal applied to the PHY logic to indicate the start or continuance of an idle condition signaled by receipt of one or more digitally encoded idle words. Processing then continues looping back to step 500 to await receipt of a next digitally encoded word on the SAS communication medium.

If the received word is not a digitally encoded idle word, step 514 retrieves the digitally encoded burst word from the associated memory having the appropriate disparity expected for the next received digitally encoded signal. Step 516 then determines whether the next received digitally encoded signal is a digitally encoded burst word. If not, the digitally encoded word is processed by other logic as some other received word to be processed in accordance with standard SAS PHY logic. Processing then continues looping back to step 500 to await receipt of a next digitally encoded word on the SAS communication medium. If step 516 determines that the digitally encoded burst word was received, step 518 clears the RXIdle signal applied to the PHY logic to indicate that the idle condition has ended and that a burst condition has been encountered. The duration of the burst condition will be determined by the number of burst words received until a next idle condition is detected.

As noted above, the particular SAS OOB signal digitally encoded is determined in accordance with SAS standards by the duration and number of the idle and burst periods. The duration of each idle and burst period in accordance with the digital SAS OOB encoding/decoding features and aspects hereof is then determined by the number of idle/burst words transmitted from the other SAS device and hence the duration of the RXIdle signal applied tot eh PHY logic.

Figure 6:
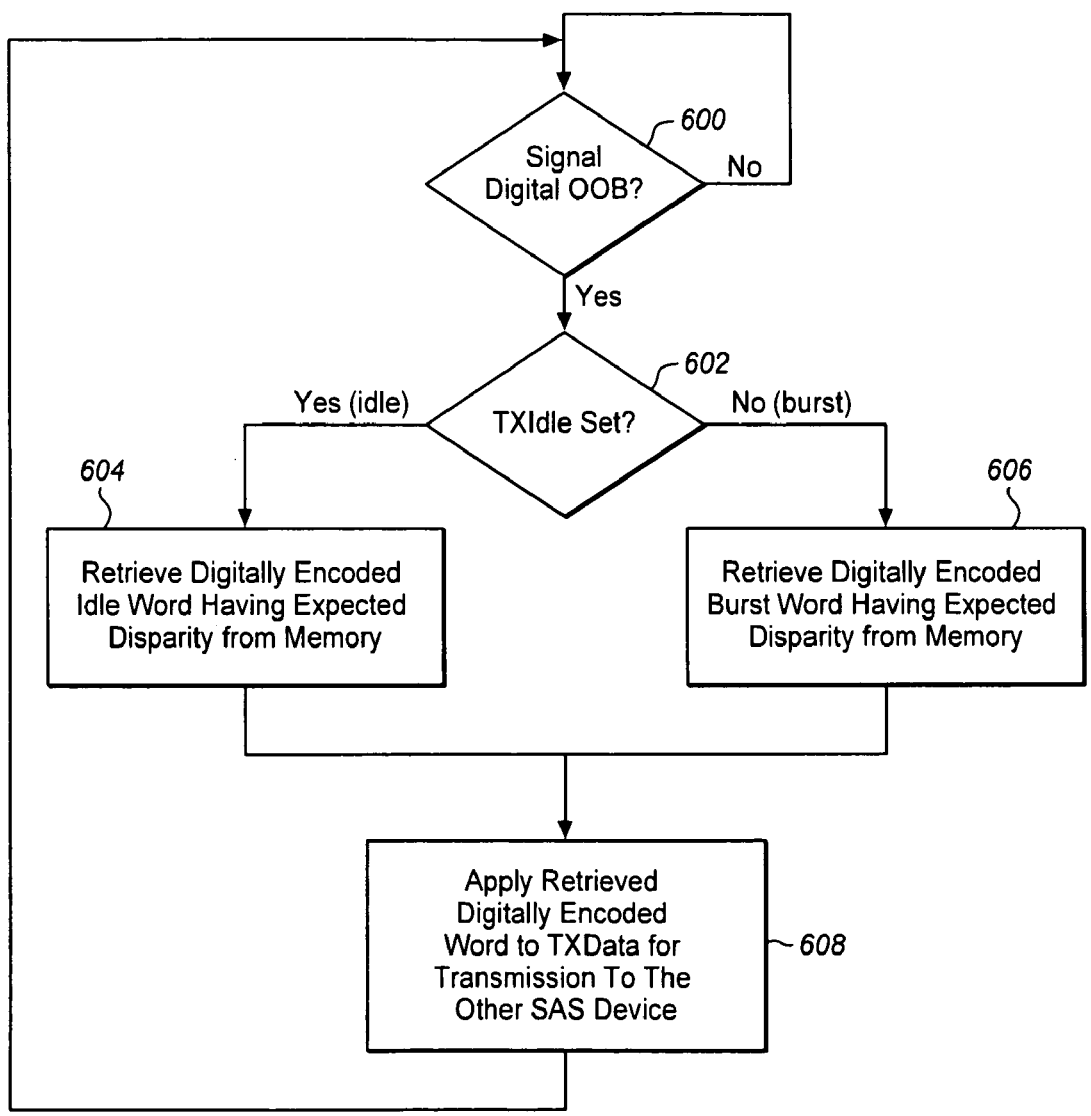

FIG. 6 is a flowchart describing another exemplary method in accordance with features and aspects hereof wherein an enhanced SAS device encodes a generated SAS OOB signal into corresponding digitally encoded information for transmission over a SAS communication medium (e.g., over an optical communication medium). The method of FIG. 6 may be performed within enhanced SAS devices such as described above with respect to FIGS. 1 and 2.

The method of FIG. 6 represents processing by enhanced circuits coupled with the PHY logic of the SAS device. The enhanced circuits and hence the method of FIG. 6 are engaged when the PHY logic indicates and need to send a SAS OOB signal to the other SAS device and the digital OOB mode has been enabled by configuration of the transmitting SAS device. Step 600 therefore awaits enablement of transmission of a digitally encoded SAS OOB signal as indicated by the PHY logic (in conjunction with the enhanced features and aspects hereof). Step 602 then tests the TXIdle signal asserted/de-asserted by the PHY logic. The TXIdle signal, as discussed above, indicates that the PHY logic has determined that an idle condition is to be signaled to the other SAS device.

Otherwise, a burst condition is to be signaled. If step 602 determines that an idle condition is to be signaled, step 604 retrieves the digitally encoded idle word (have appropriate disparity encoding) from the memory associated with the enhanced SAS device. Otherwise, step 606 retrieves the digitally encoded burst word. In both cases, the retrieved, digitally encoded SAS OOB word is then applied to the transmit data signal path to the SerDes for transmission of the retrieved digitally encoded word to the other SAS device. Processing then continues looping back to step 600 until the PHY logic indicates that the SAS OOB transmission is completed.

Additional and equivalent steps have been omitted from the flowcharts of FIGS. 5 and 6 for brevity and simplicity of this discussion. Such additional and equivalent steps will be readily apparent to those of ordinary skill in the art. Further, those of ordinary skill in the art will readily recognize that the methods of FIGS. 3 through 6 may be implemented as suitably programmed instructions in a general or special purpose processor within the enhanced SAS device, may be implemented as custom designed logic circuits within the enhanced SAS device, or may be implemented as a combination of custom logic circuits and suitably programmed instructions operable on a general or special purpose processor. Such design choices will be readily apparent to those of ordinary skill in the art.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. Apparatus integral with a PHY of a serial attached SCSI (SAS) device for coupling with another SAS device using an optical physical communication medium or using an electrical physical communication medium, the apparatus comprising:

PHY control circuits coupled with a physical communication interface and adapted to control data exchanges on the physical communication medium;

digital out of band (OOB) decoder logic coupled with the PHY control circuits, the digital OOB decoder logic adapted to detect receipt of a digitally encoded signal corresponding to a SAS OOB signal, the digitally encoded signal received from said another SAS device through the PHY control logic; and digital OOB encoder logic coupled with the PHY control circuits, the digital OOB encoder logic adapted to generate a digitally encoded signal corresponding to a SAS OOB signal, the digital OOB encoder further adapted to apply the digitally encoded signal to the PHY control circuits for transmission to said another SAS device, wherein the apparatus is operable to send and receive the digitally encoded signal without turning off a laser component of the apparatus where an optical physical communication medium is utilized, wherein the PHY control circuits are adapted to selectively utilize SAS OOB analog signaling or digitally encoded signals for communicating the SAS OOB signal to said another SAS device when the apparatus is coupled with an electrical physical communication medium, and wherein the PHY control circuits are further adapted utilize only digitally encoded signals for communicating the SAS OOB signal to said another SAS device such that SAS OOB analog signaling is not utilized when the apparatus is coupled with an optical physical communication medium.

2. The apparatus of claim 1
wherein the PHY control circuits are further adapted to couple to another SAS device through an electrical physical communication medium, and
wherein the digital OOB decoder logic and the digital OOB encoder logic are both further adapted to couple with another SAS device through an optical physical communication medium.

3. The apparatus of claim 2
wherein the digital OOB decoder logic and the digital OOB encoder logic are both further adapted to couple with another SAS device through an electrical physical communication medium.

4. The apparatus of claim 1 further comprising:
programmable memory coupled with the digital OOB encoder and coupled with the digital OOB decoder and adapted to store the digitally encoded signal for use by the digital OOB encoder to generate the digitally encoded signal and for use by the digital OOB decoder to decode a received digitally encoded signal.

5. The apparatus of claim 4
wherein the digitally encoded signal comprises a digitally encoded idle word and a digitally encoded burst word.

6. The apparatus of claim 4
wherein the programmable memory stores the digitally encoded signal in a negative disparity form and in a positive disparity form.

7. The apparatus of claim 1 further comprising:
control logic coupled with the digital OOB encoder and coupled with the digital OOB decoder and adapted to controllably enable and disable operation of the digital OOB encoder and of the digital OOB decoder,
wherein the PHY control circuits perform OOB signaling in accordance with the SAS standards on an electrical physical communication medium when the control logic disables operation of the digital OOB encoder and of the digital OOB decoder.

8. A method operable in a serial attached SCSI (SAS) device coupled to an optical physical communication medium or coupled to an electrical physical communication medium, the SAS device comprising PHY control circuits coupled with the communication medium for exchange of information with another SAS device, the method comprising:
receiving over a communication medium a digitally encoded signal from another SAS device;
decoding the received digitally encoded signal to generate a signal representing a SAS out of band (OOB) signal; and
processing the generated signal in the PHY control circuits as though the SAS OOB signal had been received without receiving or generating a SAS OOB analog signal within the SAS device,
wherein the method is operable to receive the digitally encoded signal without turning off a laser component associated with said another SAS device where an optical physical communication medium is coupled with the SAS device.

9. The method of claim 8 further comprising:
generating a SAS OOB signal within the SAS device to be forwarded to said another SAS device;
encoding the SAS OOB signal as a digitally encoded signal; and
transmitting the digitally encoded signal over said communication medium to said another SAS device,
wherein the method is operable to receive the digitally encoded signal without turning off a laser component of the SAS device where an optical physical communication medium is coupled with the SAS device.

10. The method of claim 8
wherein the step of decoding further comprises:
comparing the received digitally encoded signal with a value stored in a memory associated with the SAS device to determine if the received digitally encoded signal represents a SAS OOB signal.

11. The method of claim 10
wherein the step of comparing further comprises:
comparing a received digitally encoded idle word; and
comparing a received digitally encoded burst word.

12. The method of claim 10
wherein the step of comparing further comprises:
comparing the received digitally encoded signal with a selected value stored in said memory wherein the selected value has an expected disparity encoding associated therewith.

13. The method of claim 8
wherein the communication medium is an optical communication medium.

14. The method of claim 8
wherein the communication medium is an electrical communication medium.

15. A method operable in a serial attached SCSI (SAS) device coupled to an optical physical communication medium or coupled to an electrical physical communication medium, the method comprising:
generating a SAS OOB signal within the SAS device to be forwarded to another SAS device;
encoding the SAS OOB signal as a digitally encoded signal; and
transmitting the digitally encoded signal over a communication medium to said another SAS device,
wherein the method is operable to transmit the digitally encoded signal to said another SAS device without turning off a laser component of the SAS device where an optical physical communication medium is coupled with the SAS device.

16. The method of claim 15 further comprising:
receiving over said communication medium a digitally encoded signal from another SAS device;
decoding the received digitally encoded signal to generate a signal representing a SAS out of band (OOB) signal; and
processing the generated signal as though the SAS OOB signal had been received without receiving or generating a SAS OOB analog signal within the SAS device.

17. The method of claim 15
wherein the step of encoding further comprises:
retrieving the digitally encoded signal from a memory associated with the SAS device.

18. The method of claim 17
wherein the step of retrieving further comprises:
retrieving a digitally encoded idle word portion of the digitally encoded signal; and
retrieving a digitally encoded burst word portion of the digitally encoded signal.

19. The method of claim 17
wherein the step of retrieving further comprises:
retrieving the digitally encoded signal from a selected value stored in said memory wherein the selected value has an expected disparity encoding associated therewith.

20. The method of claim 15
wherein the communication medium is an optical communication medium.

21. The method of claim 15
wherein the communication medium is an electrical communication medium.

* * * * *